United States Patent [19]
Nakamura

[11] Patent Number: 5,339,708
[45] Date of Patent: Aug. 23, 1994

[54] SPACE-SAVING INCHING DEVICE

[75] Inventor: Akira Nakamura, Neyagawa, Japan

[73] Assignee: Tsubakimoto Emerson Co., Daito, Japan

[21] Appl. No.: 30,835

[22] Filed: Mar. 12, 1993

[30] Foreign Application Priority Data

Apr. 3, 1992 [JP] Japan .................. 4-028223[U]

[51] Int. Cl.⁵ .................................. F16H 37/06
[52] U.S. Cl. ........................ 74/665 A; 74/606 R
[58] Field of Search ............ 74/606 R, 665 A, 665 B, 74/665 C, 665 D, 665 E, 661

[56] References Cited
U.S. PATENT DOCUMENTS

| | | | |
|---|---|---|---|
| 3,225,626 | 12/1965 | Geyer | 74/665 A |
| 3,494,167 | 2/1970 | Eibe | 74/665 A |
| 4,494,635 | 1/1985 | Sommer | 74/665 C |
| 4,616,739 | 10/1986 | Sommer | 74/665 C |
| 4,765,448 | 8/1988 | Sommer | 74/665 C |

Primary Examiner—John T. Kwon
Attorney, Agent, or Firm—Howson and Howson

[57] ABSTRACT

An inching device for operation of a bucket elevator at lower than normal speed for inspection and maintenance comprises a first speed reducer having a frame, and a drive motor and a second speed reducer, both connected to input shafts of the first speed reducer, and supported on the frame of the first speed reducer, so that the entire assembly is supported by the base of the frame of the first speed reducer, thereby saving space, permitting assembly in advance of installation, and simplifying the overall structure of the device.

1 Claim, 7 Drawing Sheets

SPACE-SAVING INCHING DEVICE

BRIEF SUMMARY OF THE INVENTION

This invention relates generally to driving mechanisms for machine tools and for conveying devices such as belt conveyors, bucket elevators, and the like. It relates more particularly to improvements in a device, known as an "inching device", which operates a machine tool or conveying device at a speed lower than its normal operating speed, for maintenance and inspection.

It is conventional practice to operate a machine such as a bucket elevator at a high speed in normal operation and at a slow speed during maintenance and inspection. The inching device used to achieve alternate high and low-speed operation typically consists of a first speed reducer having a driving shaft connected to the machine, and first and second input shafts, with a driving motor coupled to the first input shaft, and a second speed reducer, driven by a low-speed motor, coupled to the second input shaft.

In a typical inching device, the first speed reducer, the driving motor, and the second speed reducer are all mounted separately on a common platform, and the driving motor and second speed reducer are coupled to the second speed reducer by means of coupling devices. One problem with the typical inching device is that it requires a wide floor space. Another problem is that, in the installation of the inching device, it is necessary to align the shafts of the driving motor and the first speed reducer respectively with first and second input shafts of the second speed reducer, and to provide special couplings to connect the aligned shafts in driving relationship.

The principal object of this invention is to provide an inching device which is more compact, as a whole, than prior inching devices. Another object of the invention is to simplify the assembly of the inching device. Another object of the invention is to provide for more accurate shaft alignment and thereby achieve smoother transmission of torque. Still another object of the invention is to reduce the overall complexity of the inching device.

In accordance with the invention, the foregoing objects are addressed by an inching device which comprises a first speed reducer having a frame, and a driving motor and a second speed reducer, both supported on the frame of the first speed reducer. More specifically, the first speed reducer comprises a frame having a base, a plurality of side walls extending upward from the base, and a top wall, two input shafts and a driving shaft, and bearing means, mounted in the frame, for rotatably supporting each of the three shafts. A driving motor is connected to one of the two input shafts of the first speed reducer. A second speed reducer is provided, comprising a low-speed motor, an output shaft, and means connecting said low-speed motor in driving relationship to the output shaft. The connecting means includes a one-way clutch for transmitting torque from the low-speed motor to the output shaft and preventing the transmission of torque from the output shaft to the low-speed motor. The output shaft of the second speed reducer is connected to the other input shaft of the first speed reducer. The driving motor and the second speed reducer are each mounted on one of the top and side walls of the frame of the first speed reducer, so that the driving motor and the second speed reducer are supported entirely by the frame.

With the driving shaft of the first speed reducer coupled to a driven apparatus such as a machine tool or conveyor, the driving motor can be used to operate the driven apparatus at a normal operating speed. The first speed reducer converts the high operating speed of the driving motor to a moderate speed for operating the driven apparatus at its normal speed. For maintenance or inspection of the driven apparatus, the low-speed motor is operated. It drives the apparatus through both the first and second speed reducers, to operate the driven apparatus as a speed slower than its normal operating speed.

With the driving motor and the second speed reducer mounted on the frame of the first speed reducer, the inching device can be made very compact, the need for separate coupling devices is eliminated, and assembly is significantly simplified.

Further objects, details and advantages of the invention will be apparent from the following detailed description, when read in conjunction with the drawings.

DETAILED DESCRIPTION

Figure 7:
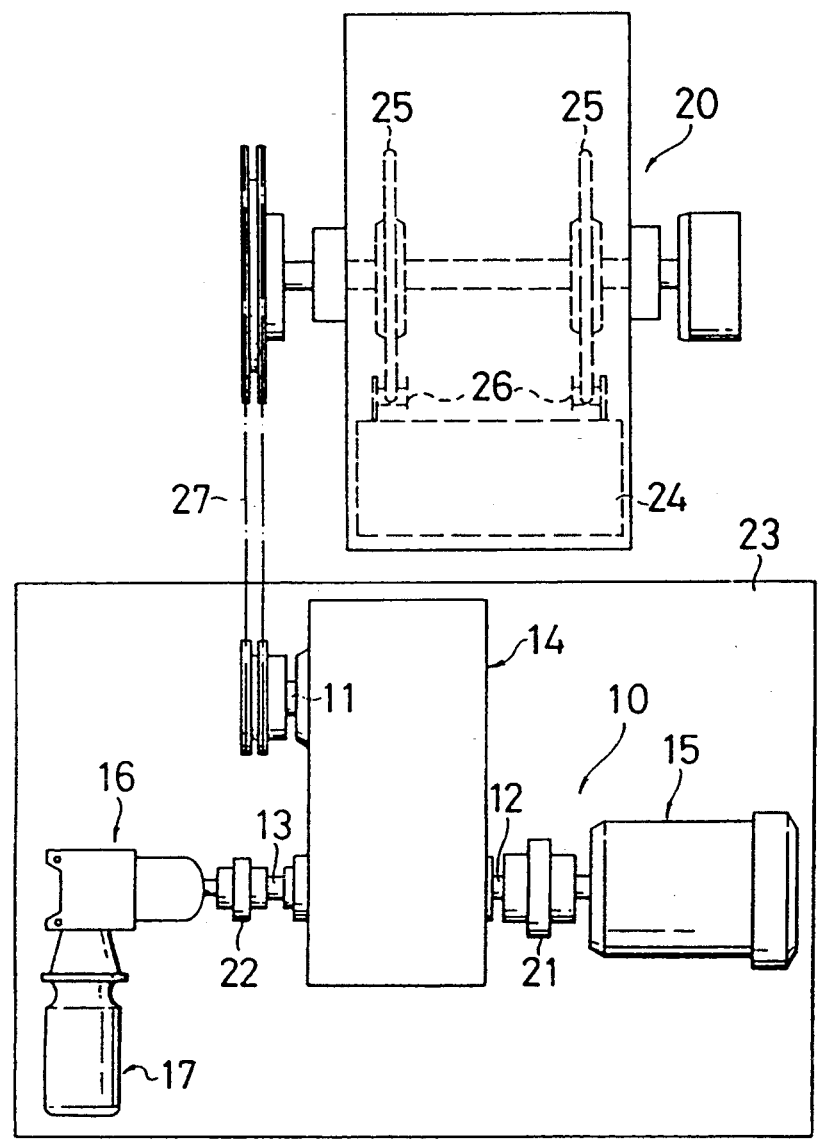
FIG. 7 is a plan view of a conventional inching device.

Referring first to FIG. 7, a conventional inching device 10 includes a first speed reducer 14 having a shaft 11 for driving a bucket elevator 20, and first and second input shafts 12 and 13. Input shaft 12 is connected to a driving motor 15 through a coupling device 21. A second speed reducer 16, driven by a low-speed motor 17, is coupled to input shaft 13, through a second coupling device 22. The shaft 11 of the first speed reducer 14 is connected through a drive belt 27 to the bucket elevator 20.

In the bucket elevator, a bucket 24 is used to carry a powdered or granular material such as cement, cereal, etc. upward or downward in a direction perpendicular to the plane of the drawing. The first speed reducer 14 converts the high rotational speed of driving motor 15 to a lower speed at driving shaft 11 to operate the bucket elevator at its normal operating speed.

For the maintenance and inspection of bucket 24, sprockets 25, and chains 26 of the bucket elevator, the low-speed motor 17 is operated. The low-speed motor 17 drives the bucket elevator through both speed reducers 16 and 14, moving the bucket 24 upward or downward at a speed much lower the normal operating speed of the bucket elevator.

The first speed reducer 14, the driving motor 15, and the second speed reducer 16 are all mounted on a common mounting platform 23, and, because motor 15, reducer 14 and reducer 16 are separately connected to the platform, it is necessary to use couplers 21 and 22 to connect the shaft of motor 15 and the output shaft of reducer 16 to the respective input shafts 12 and 13 of reducer 14.

Figure 1:
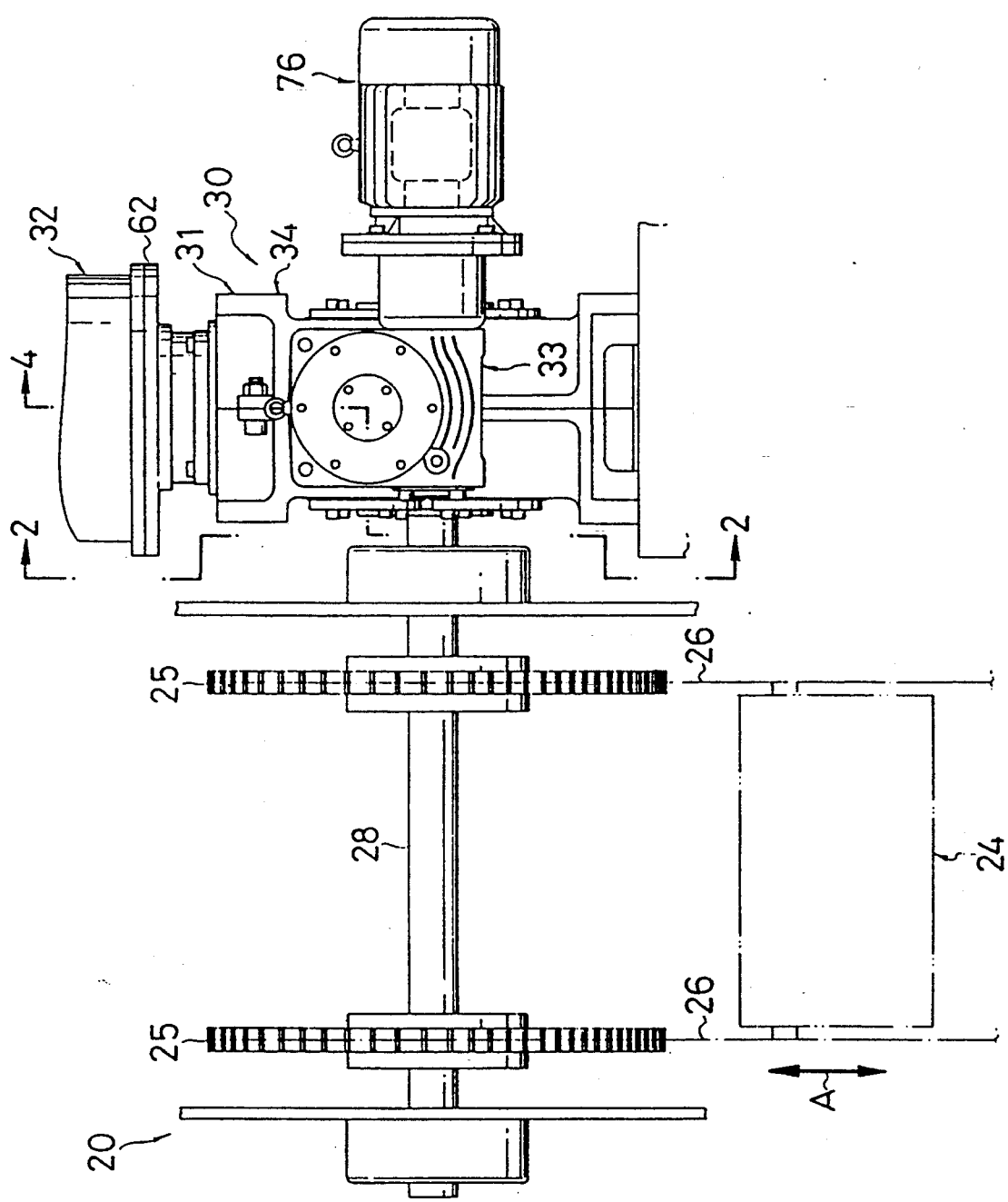
FIG. 1 is a front elevational view showing an inching device in accordance with the invention connected to a bucket elevator.
Figure 2:
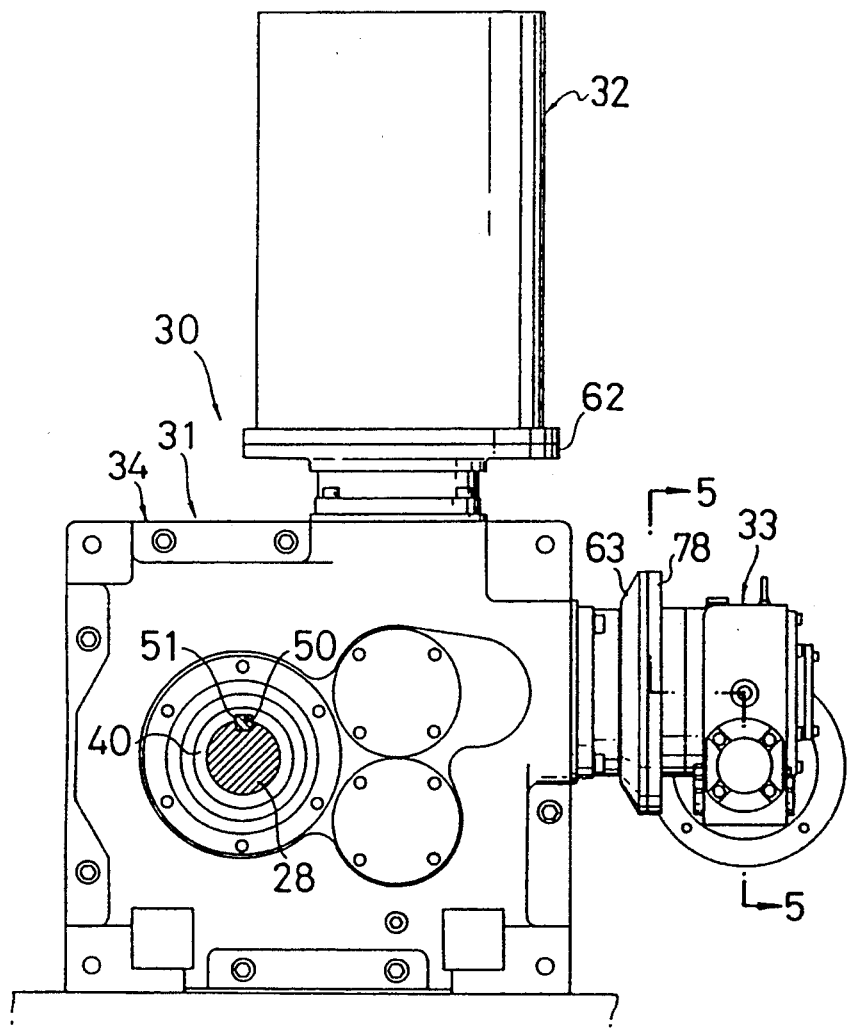
FIG. 2 is a sectional view taken through surface 2—2 in FIG. 1.

The inching device 30, shown in FIGS. 1 and 2, is also capable of driving a bucket elevator 20. Inching device 30 comprises, as its principal components, a first speed reducer 31, a driving motor 32, and a second speed reducer 33.

Bucket elevator 20 has a bucket 24 which is moved upward and downward (in the plane of the drawing, as indicated by arrow A) by the rotation of sprockets 25 which effect circulating movement of bucket-carrying chains 26. The sprockets are mounted on a rotating shaft 28, which, as shown in FIG. 2, is inserted into a tubular drive shaft 40 of the first speed reducer 31 and keyed to shaft 40 by means of a key 51 in keyway 50.

When maintenance and inspection of bucket 24, chains 26 and sprocket 25 are to be carried out, the chains must be circulated at a speed lower than their normal operating speed.

Figure 3:
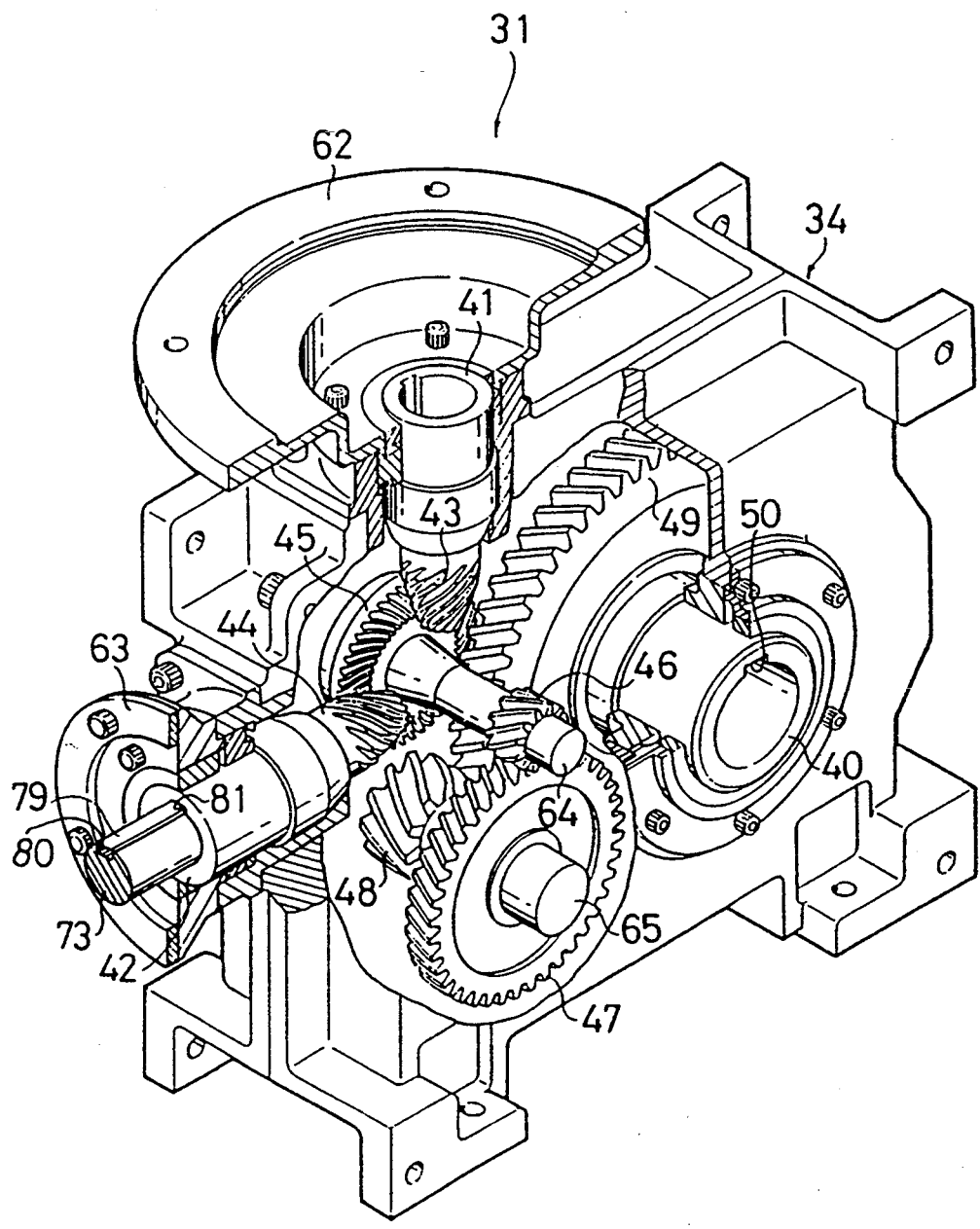
FIG. 3 is a perspective view of a first speed reducer in accordance with the invention, with its frame partially broken away to show the internal gearing.

The first speed reducer 31, shown in detail in FIG. 3, comprises a frame 34 having a base, side walls and a top wall. The driving shaft 40, and first and second input shafts 41 and 42 are mounted in bearings supported in the walls of the frame.

Bevel pinions 43 and 44, formed on the inner ends of the first and second input shafts 41 and 42 respectively, are in mesh with a common bevel gear 45.

The bevel gear 45 is coupled with the driving shaft 40 through a speed-reducing train consisting of four helical gears 46, 47, 48 and 49.

Figure 6:
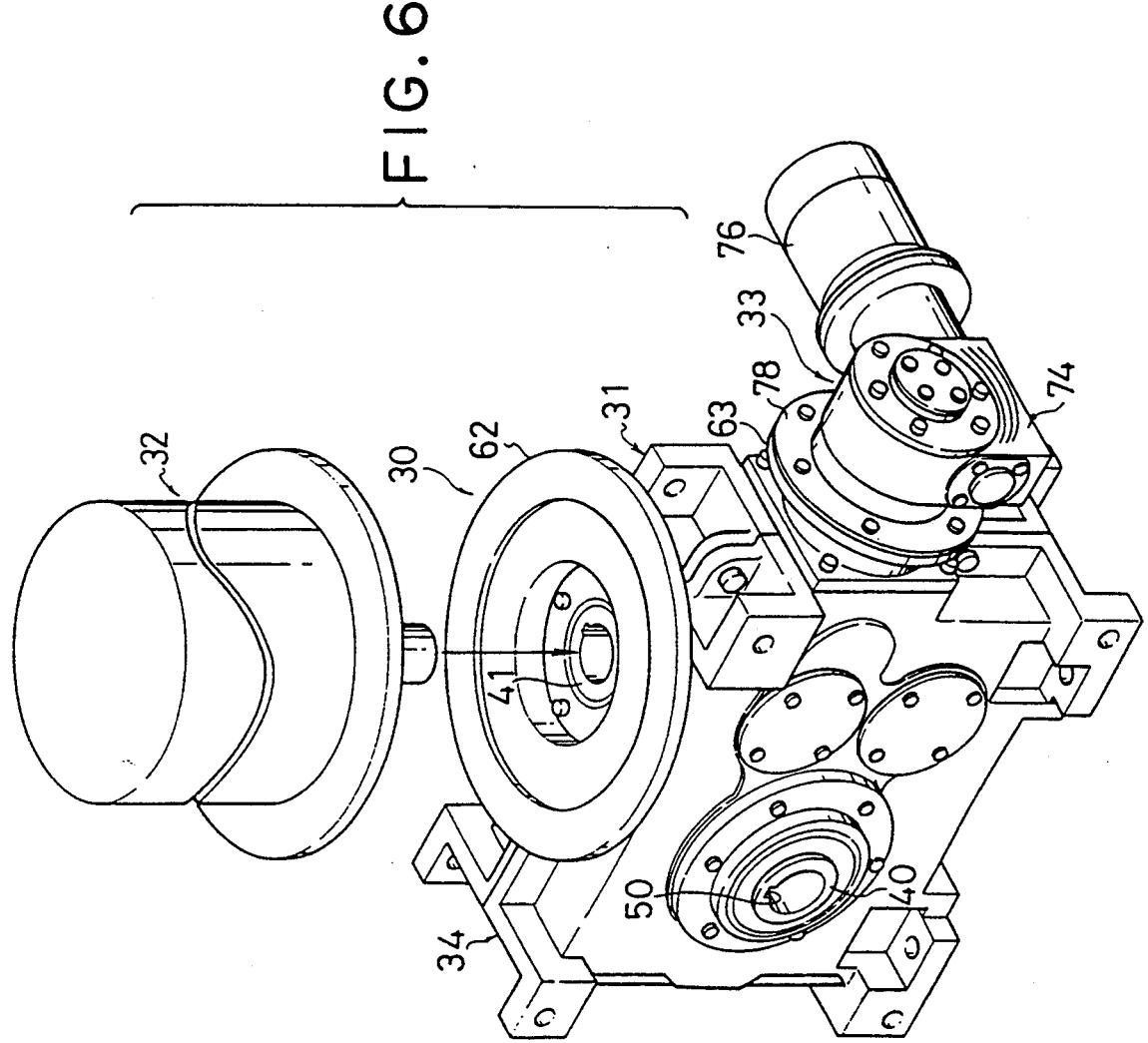
FIG. 6 is an exploded perspective view of the inching device of FIG. 1, with the driving motor disconnected from the first speed reducer.

As shown in FIG. 2, driving motor 32 is mounted on a flange 62 on the top wall of frame 34. The output shaft of driving motor 32 (shown in FIG. 6) is inserted into, and keyed to, shaft 41 of speed reducer 31. The use of the flange for mounting the drive motor aids in achieving high accuracy in the alignment of the axes of the shaft of motor 32 with shaft 41.

Figure 4:
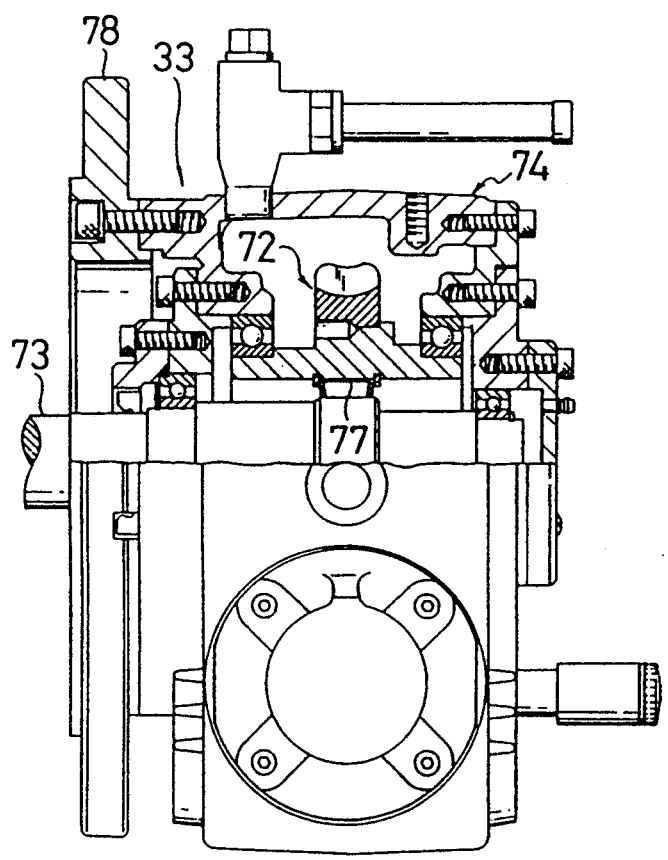
FIG. 4 is a sectional view taken through surface 4—2 in FIG. 1, showing only the second speed reducer.
Figure 5:
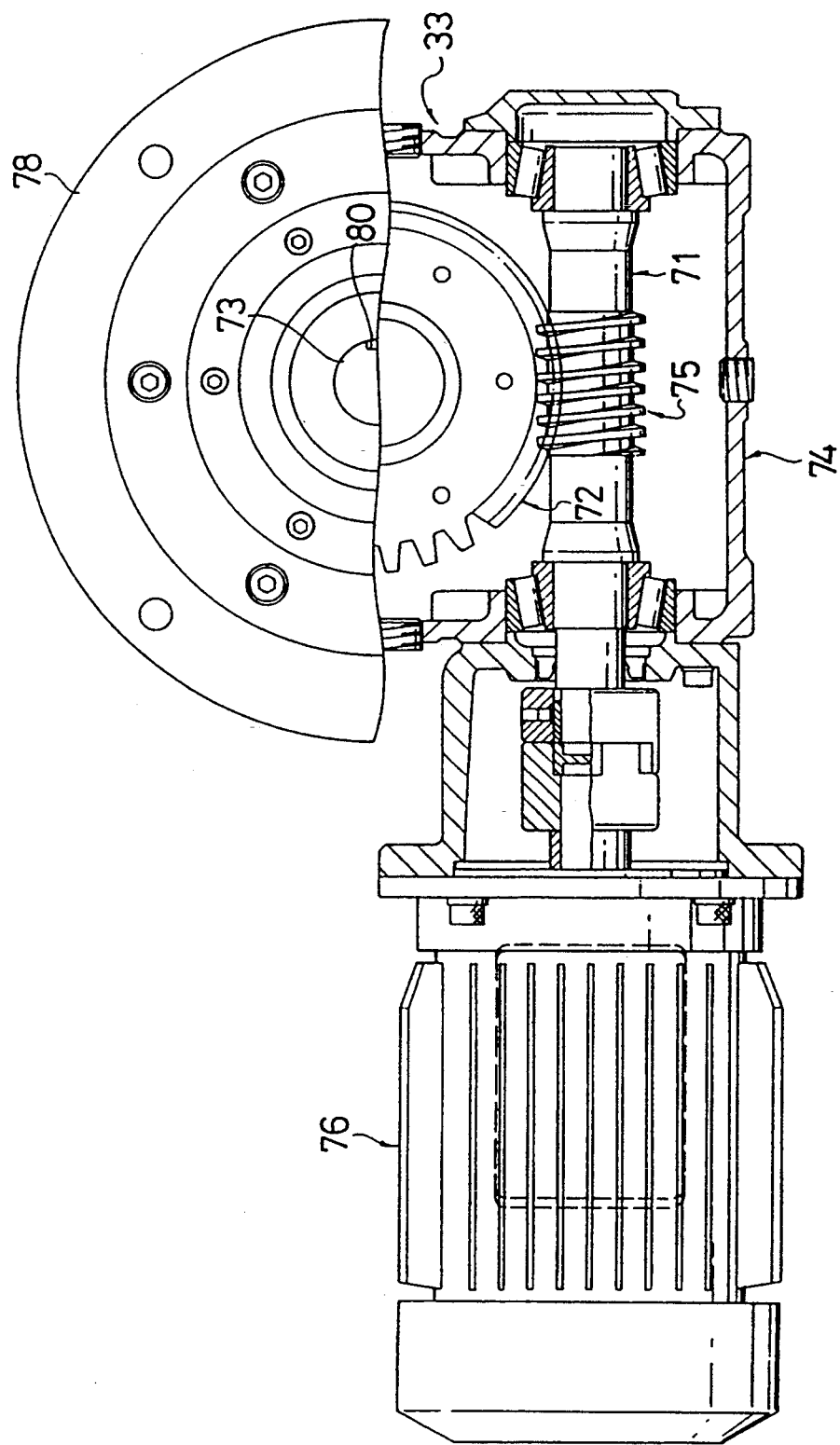
FIG. 5 is a sectional view taken through surface 5—5 in FIG. 2.

Referring to FIGS. 4 and 5, in the second speed reducer 33, a worm shaft 71 on which a worm 75 is formed, a worm wheel 72, and an output shaft 73 are all rotatably mounted in bearings in a housing 74, with worm 75 in mesh with wheel 72. A low-speed motor 76, mounted on housing 74, is arranged to drive worm shaft 71 through a coupling.

As shown in FIG. 4, a conventional one-way clutch 77 is provided between worm wheel 72 and output shaft 73. This one-way clutch can transmit torque from the worm wheel 72 to output shaft 73, but cannot transmit torque from the output shaft 73 to worm wheel 72. Thus, the torque of low-speed motor 76 is transmitted to the output shaft 73. However, when the output shaft 73 is rotated by an externally applied torque, only the output shaft turns, and no torque is transmitted to worm wheel 72. The clutch prevents externally applied torque from causing damage to worm wheel 72 and worm 75.

As shown in FIG. 2, the second speed reducer 33 is mounted on frame 34 of first speed reducer 31 by joining flange 78 of the second speed reducer with flange 63 on one of the side walls of frame 34. As shown in FIG. 3, the output shaft 73 of the second speed reducer 33 is inserted in the tubular second input shaft 42 of the first speed reducer 31, and shafts 73 and 42 are keyed together by a key 79 which cooperates with keyways 80 and 81 on the two shafts 73 and 42. Here again, the use of flanges to mount the second speed reducer to the frame of the first speed reducer aids in achieving accurate alignment of shafts 73 and 42.

In normal operation, bucket elevator 20 is driven by motor 32. As shown in FIG. 3, the torque produced by motor 32 is transmitted to driving shaft 40 through input shaft 41, bevel pinion 43, bevel gear 45, and helical gears 46, 47, 48 and 49. All of these elements in the drive train between input shaft 41 and driving shaft 40 produce a speed reduction, so that bucket 24 moves upward or downward at a normal moderate operating speed, in the direction of arrow A in FIG. 1.

As shown in FIG. 3, pinion 44 is in mesh with bevel gear 45. Consequently, during the operation of driving motor 32, output shaft 73 of the second speed reducer 33, which is connected to pinion 44, also rotates. However, one-way clutch 77 (FIG. 4) prevents the transmission of torque to worm wheel 72.

When chain 26 is to be circulated at a lower than normal speed, for inspection of bucket 24 and chain 26, the motor 76 is operated. As shown in FIGS. 4 and 5, the torque produced by low-speed motor 76 is transmitted through worm shaft 71, worm wheel 72, one-way clutch 77, and output shaft 73. As shown in FIG. 3, output shaft 73 is connected to input shaft 42 of the first speed reducer 31. Thus, the torque produced by low-speed motor 76 is transmitted to driving shaft 40 through bevel pinion 44, bevel gear 45, and helical gears 46, 47, 48 and 49. The entire drive train between motor 76 and driving shaft 40 produces a speed reduction.

When low speed motor 76 is operated instead of motor 32, driving shaft 40 of the first speed reducer 31 rotates at very low speed. Accordingly, bucket 24, chain 26, and associated moving parts move at a speed much lower than their normal operating speed, and can be inspected easily.

In the inching device in accordance with this invention, the driving motor and the second speed reducer are mounted directly on the frame of the first speed reducer. The entire assembly is supported by the base of the first speed reducer, with the driving motor and second speed reducer each mounted on one of the top and side walls of the frame of the first speed reducer. Therefore it is possible to make the inching device compact as a whole, and to achieve a substantial decrease the mounting space required for the device.

Furthermore, since the driving motor and the second speed reducer are mountable on the frame of the first speed reducer, it is possible to assemble the entire inching device in advance of installation, and thereafter install the assembled inching device in a conveyor system or machine tool. By installing the shafts of the drive motor and the second speed reducer in the input shafts of the first speed reducer in advance, it is possible to align the axes of the shafts more accurately, and thereby achieve smoother transmission of torque.

Finally, because the driving motor and the second speed reducer are mounted on frame of the first speed reducer, the coupling required in conventional inching devices can be dispensed with. Consequently, the overall structure of the inching device can be simplified.

Various modifications can be made to the apparatus described above. For example, input shaft 41 can be arranged horizontally instead of vertically, and the drive motor can be mounted on a side wall of the first speed reducer 31 instead of on its top wall.

In another modification, instead of coupling driving motor 32 to shaft 41, and coupling reducer 33 is shaft 42. Speed reducer 33 can be coupled to shaft 41, and driving motor 32 can be coupled to input shaft 42.

In still another modification, shaft 64 of the bevel gear 45 and helical gear 46 can be used as one input shaft and shaft 65 of helical gears 47 and 48 can be used as the other input shaft. With the driving motor 32 connected to shaft 64 and the second speed reducer connected to shaft 65, speed reducer 31 operates at a smaller speed reduction ratio.

Numerous other modifications can be made to the invention described herein without departing from the scope of the invention as defined in the following claims.

Claims:

1. An inching device for operating a conveyor, machine tool or the like alternatively at a normal operating speed, and at a low speed for inspection or maintenance, comprising:

a first speed reducer comprising a frame having a base, a plurality of side walls extending upward from the base, and a top wall, two input shafts and a driving shaft, and bearing means for rotatably supporting each of said shafts, said bearing means being mounted in the frame;

a driving motor connected to one of said input shafts of the first speed reducer; and a second speed reducer comprising a low-speed motor, an output shaft, and means connecting said low-speed motor in driving relationship to said output shaft, said connecting means including one-way clutch means for transmitting torque from said low-speed motor to said output shaft, and preventing the transmission of torque from said output shaft to said low-speed motor, and said output shaft of the second speed reducer being connected to the other input shaft of the first speed reducer;

wherein said driving motor and said second speed reducer are each mounted on one of said top and side walls of the frame of the first speed reducer, whereby the driving motor and second speed reducer are supported entirely by said frame.

* * * * *